United States Patent [19]
Borner et al.

[11] 4,435,982
[45] Mar. 13, 1984

[54] MACHINE AND METHOD FOR BALANCING WHEELS

[75] Inventors: Willy Borner, Cupertino; Bernie F. Jackson, Los Gatos, both of Calif.

[73] Assignee: Balco, Inc., San Jose, Calif.

[21] Appl. No.: 236,558

[22] Filed: Feb. 20, 1981

[51] Int. Cl.³ ............................................ G01M 1/22
[52] U.S. Cl. ..................................................... 73/462
[58] Field of Search ................ 73/457, 462, 464, 463, 73/465, 466

[56] References Cited

U.S. PATENT DOCUMENTS

| | | |
|---|---|---|
| 2,383,405 | 8/1945 | Merrill et al. ......................... 73/457 |
| 3,076,342 | 2/1963 | Hilgers .................................. 73/462 |
| 3,910,121 | 10/1975 | Curchod et al. ...................... 73/462 |
| 4,085,619 | 4/1978 | Shapiro ................................ 73/462 |
| 4,193,305 | 3/1980 | Hunter ................................. 73/462 |

Primary Examiner—Herbert Goldstein
Attorney, Agent, or Firm—Burns, Doane, Swecker & Mathis

[57] ABSTRACT

A machine and method for balancing wheels is disclosed whereby the wheel is affixed to and spun on a rotatable shaft to an initial velocity, the drive unit is decoupled and the forces of unbalance are measured during the first full revolution of the shaft after it reaches a predetermined measuring velocity. The initial velocity is selected as the lowest of a plurality of velocities which will yield a time from decoupling to measuring of unbalance of at least 2 seconds. Automatically activated drive and brake mechanisms are also disclosed as is a system of unbalance sensor arrangement having two movable sensors linked to one another at a fixed distance.

22 Claims, 3 Drawing Figures

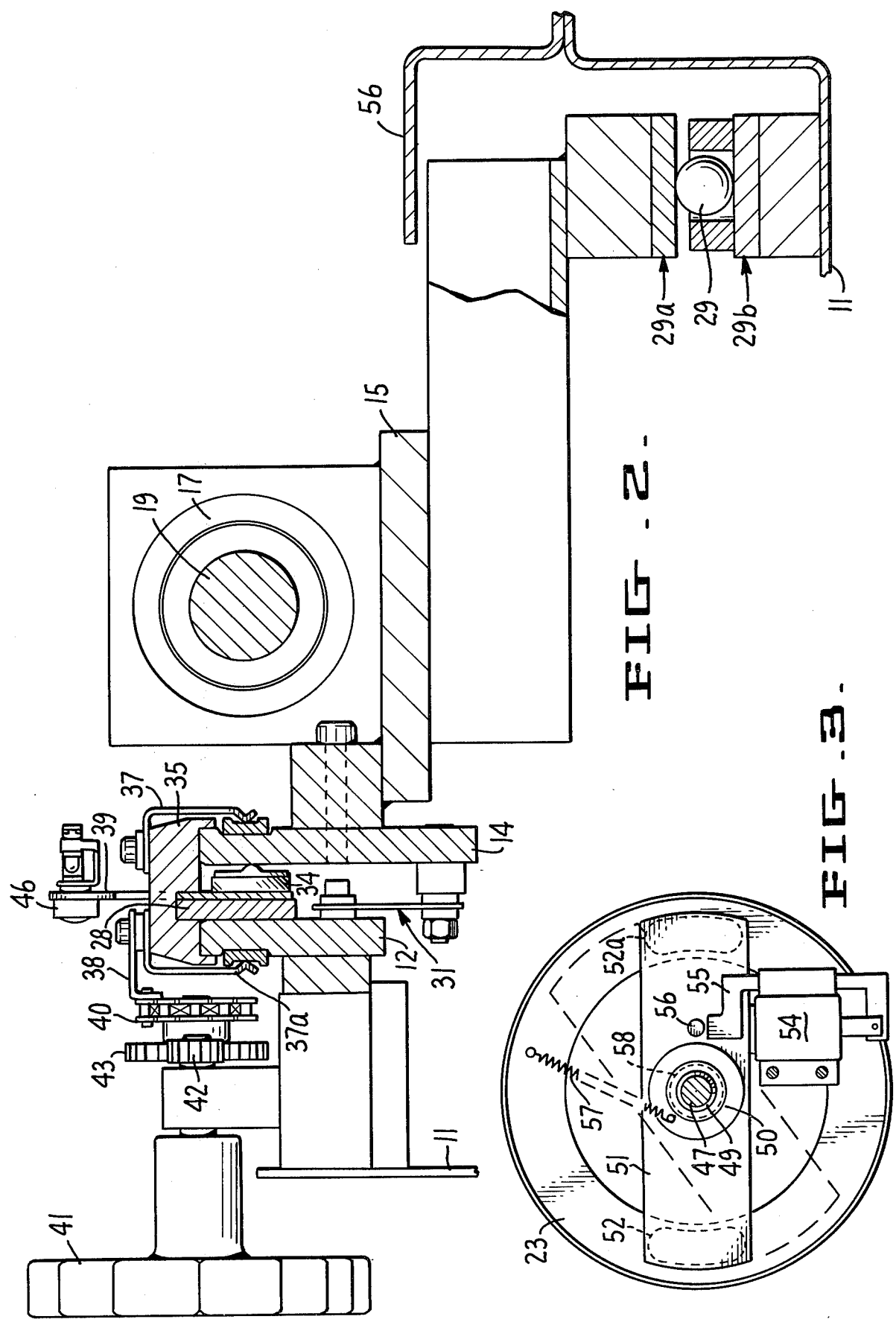

MACHINE AND METHOD FOR BALANCING WHEELS

BACKGROUND OF THE INVENTION

This invention relates to a machine and method for dynamically determining the unbalance of unbalanced rotors, especially wheels of motor vehicles.

It is conventional to determine rotational unbalance of a body such as a vehicle wheel by attaching the body to a rotatable shaft, driving the shaft at a constant velocity with the body attached and simultaneously measuring the vibration of the shaft brought about by the unbalance of the body. These vibrations can then be related to the unbalance by methods well known to the art. In most modern balancing machines, the measurement of vibration is accomplished by means of transducers which produce electrical signals that are proportional to the magnitude of vibration; which electrical signals can be converted to a readable measure of unbalance.

Present commercial wheel balancers measure unbalance with their drive motor engaged to and driving the balancing shaft. This offers the advantage of providing a constant rotational velocity. However, the engaged drive unit introduces vibrations of its own and by its bulk dampens the vibrations of the unbalanced body so that high angular velocities are required to detect them. The variety of belt, gear and direct drive systems that have been proposed in attempts to minimize these shortcomings attest to their seriousness.

U.S. Pat. No. 3,076,342 issued to Karl Hilgers of the Losenhausenwerk Dusseldorfer Maschinebau A. G. discloses a balancing machine for small rotating bodies in which a drive unit spins the body and is then disconnected. The unbalance is measured as the body coasts to a stop with the measured value being recorded by a mechanical meter lock which engages at a predetermined speed. Unfortunately, with its continuous measurement, this device essentially averages unbalance over a range of speeds. With constant sized objects, such as might be found in a machine shop setting, there is a uniform rate of deceleration and this averaging effect can be compensated for. In a common wheel and tire balancing setting, the objects to be balanced vary in size from as little as 20-30 lbs to as much as 300-400 lbs. In addition, the tread patterns of tires vary from very smooth to extremely coarse. This leads to widely differing wind resistances. These factors give rise to widely variable deceleration rates which cannot be routinely compensated for and would require time-consuming repeat spins to obtain an accurate unbalance reading.

Our studies have disclosed another problem as well when a coasting balancing system is employed with widely variable tires and wheels. It has been observed that it takes a finite time for the vibrations introduced by decoupling the drive unit to settle out, i.e., dampen out. In addition, electrical circuits require a similar settling period. This time period is on the order of 2-4 seconds. If the object being measured has a very rapid deceleration so that the preset measuring velocity is reached too soon after decoupling, that is before the vibrations and electrical circuiting have settled, an inaccurate reading results. This can occur with very heavy tread, high wind resistance tires. Merely spinning all tires to a higher speed is not a uniform answer as this results in unacceptably long coast periods with smoother, lower wind resistance tires.

The present invention has as its primary object the elimination of the disadvantages of the prior art balancing machines and the solution of these problems that have been uncovered.

STATEMENT OF THE INVENTION

In accord with the present invention, a balancing machine and method for balancing wheels and tires are provided with which and by which the wheel to be balanced is spun to an angular velocity greater than a preset measuring velocity, the drive mechanism is disconnected from the wheel and the wheel is permitted to slow and its angular velocity is measured. In a preferred embodiment of the invention, the velocity greater than the preset measuring velocity is itself selected from among a plurality of velocities (2 or more velocities) so that the time from the disconnection of the drive mechanism until the measuring velocity is reached is a time greater than the settling time but brief enough for commercial acceptance. Such a time is generally from about 2 seconds to about 20 seconds preferably from about 3 seconds to about 10 seconds. During the wheel's first full revolution after reaching the preset measuring velocity, the position and magnitude of the wheel's unbalance are measured and thereafter displayed. This machine and method permit accurate and reproducible determination of unbalance at relatively low angular velocities. Multiple spins are not required. The wide range of sizes of wheels and tires may be balanced.

In another aspect, the invention provides a wheel-balancing machine having two piezoelectric unbalance sensors that are fixed in relation to one another but are together movable in a direction parallel to the balancing machine's rotor axis.

In yet another aspect, this motion provides a wheel balancer having an automatic helically actuated drive clutch and an automatic helically actuated brake mechanism.

BRIEF DESCRIPTION OF THE DRAWINGS

The invention is more fully explained in the following detailed description wherein reference is made to the accompanying drawings. In the drawings, FIG. 2 is a sectional view of the same machine taken as shown by line 2—2' in FIG. 1, and FIG. 3 is a sectional view of the same machine taken as shown by line 3—3' in FIG. 1.

DETAILED DESCRIPTION OF THE INVENTION

Figure 1:
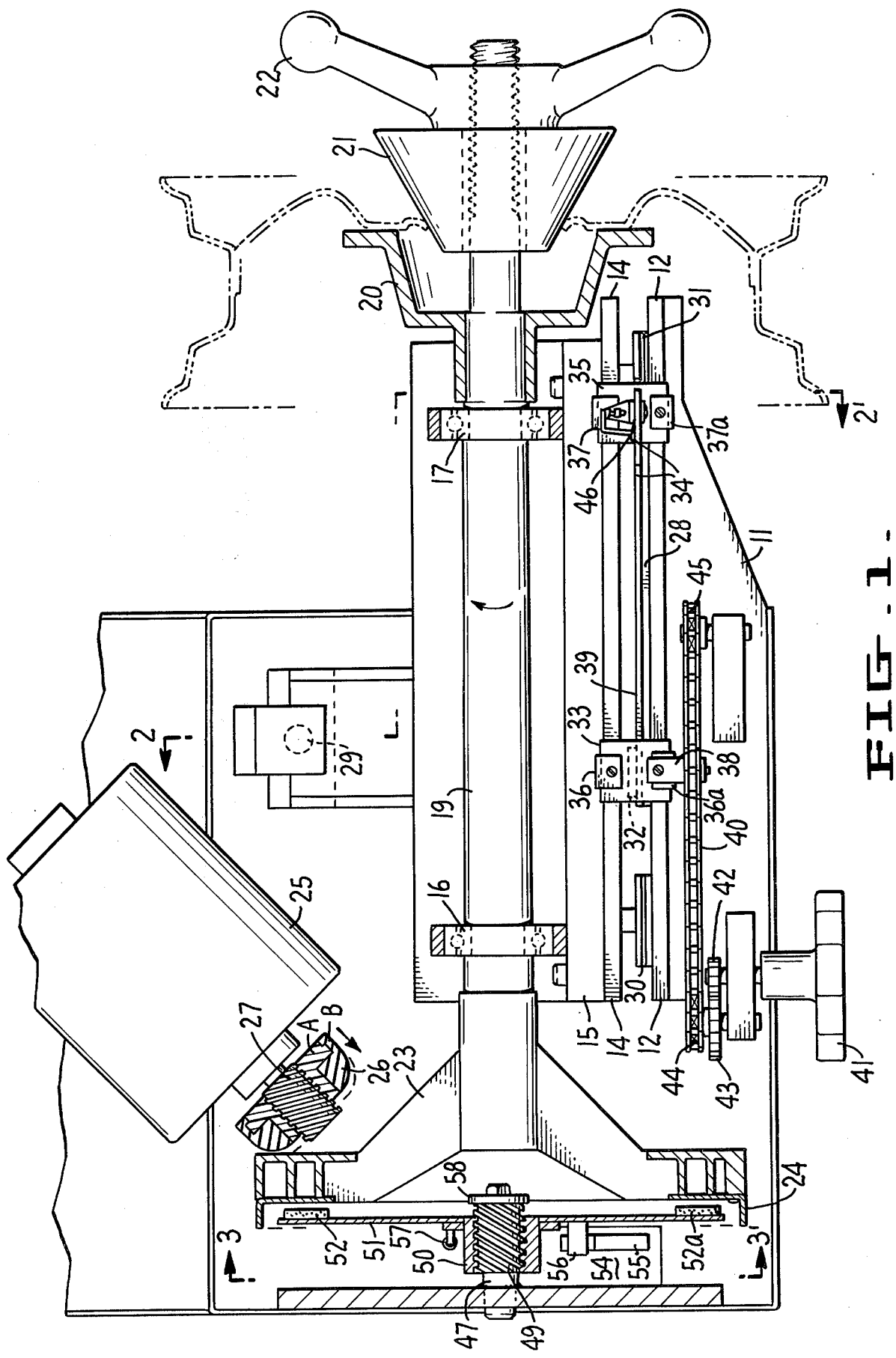
FIG. 1 is a plan view of a machine embodying the present invention.

Referring to FIG. 1, a machine embodying the present invention is shown that includes a chassis 11 which serves to support the mechanical and electrical components of the machine. Fixed rail 12 is attached to Chassis 11 and is parallel to floating rail 14 which is attached to subchassis 15. Spaced bearings 16 and 17 are mounted on subchassis 15 and receive and support drive shaft 19. Drive shaft 19 carries wheel mounting flange 20 which provides a mounting surface to which the wheel assembly to be balanced may be temporarily attached by conical adaptor 21 and hub nut 22 which is threadably received by shaft 19. The wheel assembly is mounted by placing it on shaft 19 followed by adaptor 21 and hub nut 22. As hub nut 22 is tightened it forces the wheel against flange 20 and centers it on the shaft. Conical adaptor 21 can be adapted as required to permit the mounting of the range of sizes, shapes and types of wheels that are to be balanced.

To the other end of shaft 19 is mounted disk 23 upon the rim of which is mounted slotted wheel 24. The slots of wheel 24 are spaced to provide optical registration of the rotational position and angular velocity of shaft 19. Shaft 19 is rotated by a drive unit made up of motor 25, drive wheel 26 and clutch 27 driving disk 23. Motor 25 is mounted on chassis 11 and temporarily engages the surface of disk 23 by means of drive wheel 26 which is attached to motor 25 vial helical gear clutch 27. At rest, drive wheel 26 does not engage the surface of disk 22. When motor 25 is turned on it rotates helical gear clutch 27 adapted to move wheel 26 away from motor 25 toward and to engage via friction the surface of disk 23 and drive shaft 19. Motor 25 is positioned with its axis about diagonal to the plane of disk 23. This position and the angle of the helical gear in clutch 27 holds drive wheel 26 in firm engagement with the face of disk 23 when the speed of disk 23 is less than the ultimate speed of drive wheel 26. Drive wheel 26 is shown as a two section construction. The inner section (insert A) is fabricated of a low friction, low wear bearing material such as nylon or delrin, or the like, in which the helical gear teeth are cut and by which motor 25's drive force is evenly transmitted to the outer section (section B) of wheel 26. The outer section B is made of an elastomeric, high friction, deformable material such as rubber, neoprene, poly(urethane) or the like. The outer section compresses and deforms under the driving load imposed on wheel 26 when it is in contact with the face of disk 23.

When motor 25 is not applying power to drive wheel 26, as when the motor is turned off, the inertia of wheel 26 and relief of the deforming compression of outer section B of wheel 26 causes the wheel to retract via helical gear clutch 27 and disengage from the surface of disk 23. This permits shaft 19 to coast without disturbance from motor 25 or other parts of the drive unit.

The helix lead angle of gear clutch 27 is selected to be an angle greater than a self locking angle to assure wheel 26's ability to freely retract. An angle of 45° is very suitable but of course other functionally equivalent lead angles can be used as well.

Vibrations arising from unbalance of a wheel attached to flange 20 are transmitted through shaft 19 and bearings 16 and 17 to subchassis 15. Subchassis 15 is movably positioned on chassis 11 by ball support 29 and hangers 30 and 31 which are adapted to restrict the movement of subchassis 15 into a single plane. The vibrations transmitted to subchassis 15 serve to move it in this plane. The movement of subchassis 15 relative to chassis 11 is transmitted to piezoelectric disks 32 and 34 which are part of a subassembly located between rails 12 and 14 by clamps 33 and 35, respectively, which engage fixed rail 12 and floating rail 14 and, with springs 36, 36a, 37 and 37a hold them tightly to disks 32 and 34.

In the preferred embodiment illustrated, the position of piezoelectric disks 32 and 34 relative to one another is fixed by reinforcing plate 28 and printed circuit board 39 (which board also furnishes electrical connection to disks 32 and 34) but the disks are movable in concert along rails 12 and 14 such as by link chain 40. Link chain 40 engages disks 32 and 34 via bracket 38 and is driven by hand wheel 41 through gears 42 and 43 drive sprocket 44 and idler sprocket 45, all supported on chassis 11. The ability to move piezoelectric disks 32 and 34 permits disk 34 to be positioned directly in the inner balancing plane of the wheel, which generally is in line with the inner rim of the wheel. This enables a more accurate determination and correction of the wheel's unbalance. The correct position of disk 34 is determined visually, optionally by aligning a focused light beam with the inner balancing plane of the wheel. The focused light beam is projected perpendicularly to shaft 19 by projector 46 that is mounted on printed circuit board 39 in a position in alignment with disk 34.

In use, after mounting the wheel to be balanced on flange 20, motor 25 is turned on to drive disk 23 and shaft 19 via clutch 27 and drive wheel 26. The rotational velocity of shaft 19 is monitored by optical means not shown measuring the frequency of passage of the slots of slotted wheel 24 as it rotates. Such optical means are well known in the art. When the measured rotational velocity exceeds a predetermined value at which the unbalance determination is to be made (the predetermined velocity), or, alternatively, when shaft 19 has been accelerated for a time period previously determined to result in a rotational velocity in excess of such predetermined value, motor 25 is turned off and disengaged from disk 23. The rotational velocity of shaft 19 is continuously monitored as shaft 19 coasts, gradually losing momentum. The time elapsed from the instant motor 25 disengaged from disk 22 is also measured to assure adequate settling time. If the time measured between the disengagement of motor 25 from disk 23 and the achievement of the predetermined velocity is equal to or greater than the time required to settle the vibrations of disengagement and the electrical circuits, which settling time is in the range of about 2–20 seconds, very suitably 2–6 seconds, preferably 2–4 seconds and most preferably about 3 seconds, and when the measured velocity of shaft 19 exactly equals the predetermined measuring value generally selected in the range of 380±40 rpm, an accurate measurement of forces of unbalance can be carried out. The absolute magnitude of the predetermined measuring value can be varied as desired. The 380±40 rpm value shown has been found to work well with common bearings sensors, circuits and the like as balancer components. Higher rotational speeds are not seen to offer advantages and would impose heavier loads on the balancer frame and components. Lower rotational speeds can be of advantage but because of the resulting lower magnitude of unbalance forces can require more sensitive sensors, more precise bearings and the like. The electrical signals generated by piezoelectric disks 32 and 34 proportional to the unbalance forces are measured for one complete revolution of shaft 19. These signals are related to the angular position of shaft 19 as determined from slotted wheel 24 and processed by conventional electronic circuitry or conventional microprocessing circuits not shown and displayed by conventional visual display means not shown in the form of an indication of the size and position of weights to be added to compensate the unbalance of the wheel attached to flange 20.

The initial rotational velocity of shaft 19 and the attached wheel is selected from a plurality of velocities (preferably 2 velocities) such that it is the lowest velocity that will allow adequate settling time prior to reaching the preset measuring velocity. Larger, heavier tires generally give rise to larger mechanical vibrations which require longer settling times as noted. Larger tires such as truck or off-road tires also are characterized by deep tread patterns which have high air resistance and rapid decelerations during coasting and thus provides short settling times. These tires, thus, can require a higher initial velocity to assure adequate settling time.

The selection of initial velocity can be carried out automatically such as by either of the following methods: The first method is based on the fact that deep tread tires that decelerate too rapidly are slow to acelerate as well. In this method, the tire is accelerated for a set period such as 8 seconds and the shaft's velocity is checked. If it equals or exceeds a first value (A), the drive motor is turned off and decoupled. If the shaft has not reached value A, the acceleration drive is continued for an additional period such that a higher velocity (B) is achieved. (B>A)

Alternatively, shaft 19 and its attached wheel is spun to a first value A, the drive motor being then decoupled. In the event that the time measured between the disengagement of motor 25 from disk 23 and the achievement of the predetermined velocity is less than the about 2 second settling time, motor 25 is reactivated to drive shaft 19 to a new higher rotational velocity from which the time to coast to the predetermined velocity will equal or exceed the 2-4 second settling time. The previously-described measurement of unbalance shall take place when the predetermined velocity is achieved.

If desired to speed up the measurement cycle, a brake can be applied to slow and stop shaft 19 at any time after the unbalance measurement at the present velocity has been completed. A suitable brake includes center post 47 attached to chassis 11 in axial alignment with shaft 19. Post 47 itself or via bushing 49 carries a helical thread which rotatably mates with helically threaded brake plate center 50. The lead angle of this helical thread and the materials employed are chosen to prevent the helix from locking due to friction. Thus, a steep lead angle, such as 45°, and a low friction material such as nylon or delrin are employed for center 50. The helical threads are cut in the direction that when brake plate center 50 rotates in the same direction as the normal direction of shaft 19, brake plate center 50 moves closer to disk 23 until it reaches stop 58. To brake plate center 50 is affixed a brake plate 51 which has 2 or more arms equally spaced radially around center 50. Plate 51 is made of a resilient material such as spring steel and has affixed to the outside ends of its arms friction pads 52 and 52a. The plane of brake plate 51 is parallel to the flat surface of disk 23 and is spaced away from the flat surface of disk 23 such that when center 50 rotates on its helical threads, friction pads 52 engage the surface of disk 23. In use, center 50 is rotated to cause such engagement such as by solenoid 54 which when activated drives ram 55 against plate 51. When friction pads 52 and 52a engage the surface of rotating disk 23, this causes additional rotation of center 50 and further movement of center 50 toward disk 23. This, in turn, temporarily deforms resilient plate 51 which puts additional engagement pressure on pads 52 and 52a and effects a slowing of rotation of disk 23. The amount of deformation and brake force is set by the predetermined travel of center 50 as limited by stop 58.

Turning to FIG. 2, a section taken as shown by line 2—2' in FIG. 1, the relationship of certain of the previously described elements of the balancing machine of this invention may be more clearly seen, particularly those that position subchassis 15 with relation to chassis 11. Ball support 29 is shown to be placed between hardened plates 29a and 29b. Safety stop 56 limits the upward movement of subchassis 15 to prevent damage to the sensor assembly during tire mounting and the like.

Also further shown in FIG. 2 is the relationship of the piezoelectric disks to rails 12 and 14. Disk 34 is held in firm engagement to these rails by clamp 35 and springs 37 and 37a. Printed circuit board 39 and reinforcing plate 28 are coupled to clamp 35 as is bracket 38 which attaches the piezoelectric disk assembly to chain 40. Hand wheel 41, gears 42 and 43 and link chain 40 which together serve to align piezoelectric disk 34 in the inner balancing plane are shown in this Fig. as is light projector 46 which confirms this alignment. Clamp 35 holds fixed rail 12 and floating rail 14 in parallel alignment and together with board 39 and plate 28 limits the motion of rail 14 to the direction perpendicular to the flat faces of piezoelectric disk 34. Spring steel alignment bracket 31 linking rails 12 and 14 also limits the motion of rails 12 and 14 to a single plane.

Turning to FIG. 3, a section taken as shown by line 3—3' in FIG. 1, the brake system is further set forth. In FIG. 3, center post 47 with bushing 49 and brake plate center 50 helically rotably attached, are shown. Brake plate 51 is affixed to brake plate center 50 with friction pads 52 and 52a bonded on the inner surfaces of radially disposed arms. Plate 51 is shown in two superimposed positions—a first position at rest and a second position when pads 52 and 52a are in engagement with disk 23. Solenoid 54 drives ram 55 which in turn pushes on pin 56 affixed to brake plate 51 to rotate the brake plate toward stop 58 and cause friction pads 52a and 52 to engage the surface of disk 23 and halt disk 23's rotation. This engagement also causes plates 51 to rotate further and deform applying pressure to pads 52 and 52a. Return spring 57 is provided between brake plate 51 and chassis 11 (not shown) to assist in the withdrawal of brake plate 51 from disk 23 after disk 23's rotation has halted. The primary withdrawal force is provided by relieving the force of the deformation of plate 51 itself, however.

It will be understood that although the apparatus and method of the invention has hereinbefore been described and illustrated in the drawings with reference to particular embodiments, those skilled in the art will be familiar with, and will appreciate that, variations can be introduced in the apparatus and the method while still remaining within the embodiments of this invention.

We claim:

1. A wheel balancing machine which comprises a chassis, a rotatable shaft, means on one end of said shaft for removably mounting the wheel to be balanced, carrier means for supporting said shaft on said chassis, driving means for rotating said shaft to a first angular velocity greater than a predetermined second angular velocity, clutch means for decoupling said driving means from said shaft when said first angular velocity has been attained thereby allowing said shaft and wheel to rotate freely and decelerate, means for measuring the angular velocity of the shaft and activating unbalance measuring means when said angular velocity is equal to said predetermined second angular velocity after said driving means has been decoupled from said shaft, said unbalance measuring means being adapted to measure unbalance during the first full revolution of said shaft after said shaft reaches said predetermined second angular velocity, and means for displaying the value of unbalance so measured, said first angular velocity being selected from two or more velocities in response to said angular velocity measuring means so as to provide the lowest velocity of said two or more velocities that will permit a 2 to 20 second settling period between decoupling said driving means and activating said unbalance measuring means.

2. The wheel balancing machine of claim 1 wherein said means for measuring unbalance include two piezoelectric cells for sensing unbalance, said cells being mounted on fixed relationship to one another but movable in concert in a direction perpendicular to the plane of said wheel.

3. The wheel balancing machine of claim 2 wherein said cells are movable so as to place one cell within the inner wheel rim balance plane.

4. The wheel balancing machine of claim 3 wherein the placement of said cell within the inner wheel rim balance plane is confirmed by a projected beam of light.

5. The wheel balancing machine of claim 1 additionally comprising brake means for stopping the rotation of said shaft after said unbalance has been measured.

6. The wheel balancing machine of claim 5 wherein said brake means includes flat plane means fixed to said shaft parallel to said balance plane, resilient brake plate means having friction surface means affixed thereto, said plate being rotatably mounted in axial alignment with said shaft and helix gear means for moving said friction surface means into contact with said flat plane means when said brake plate is rotated in the direction of rotation of said shaft.

7. The process for determining the unbalance of a wheel which comprises mounting said wheel on the end of a rotatable shaft, rotating said shaft to an initial angular velocity with a drive unit attached to said shaft, measuring the angular velocity of said shaft, determining from said measurement whether said initial velocity is sufficient to provide a settling time of a least two seconds between said initial velocity and a predetermined measuring velocity when said shaft is allowed to freely decelerate, rotating said shaft to a second velocity greater than said initial velocity if the initial velocity is determined not to be sufficient to provide a two-second settling time, decoupling said drive unit from said shaft after said shaft has been rotated to the lower one of said initial and second velocities that is determined to be sufficient to provide a two-second settling time and permitting said shaft to slow to said predetermined measuring velocity, measuring the forces of unbalance during the first full revolution of the shaft after it reaches said predetermined measuring velocity and displaying the values of the forces so measured.

8. The process of claim 7 wherein said settling time is from about 2 to 20 seconds.

9. The process of claim 8 wherein said settling time is from about 2 to about 4 seconds.

10. The process of claim 7 wherein said measuring of forces of unbalance is carried out using two piezoelectric cells that are in fixed relationship to one another and movable in concert in a direction parallel to said shaft.

11. The process of claim 10 wherein prior to rotating said shaft, one piezoelectric cell is positioned within the inner wheel rim balance plane.

12. The process of claim 11 wherein the position of the piezoelectric cell within the inner wheel rim balancing plane is determined by observing the reflection off the inner rim of the wheel of a light beam projected perpendicular to the shaft within the balance plane by light projection means fixably mounted in alignment with the movable piezoelectric cell.

13. The process of claim 7 wherein the rotation of said shaft is braked following said measuring of forces of unbalance.

14. The method of claim 7 wherein said step of rotating to an initial angular velocity comprises accelerating said shaft for a predetermined period of time, and said step of determining comprises detecting whether the angular velocity of said shaft exceeds a predetermined value after it has been rotated for said period of time.

15. The method of claim 14 wherein said step of rotating to a second velocity comprises accelerating said shaft for a second predetermined period of time.

16. The method of claim 7 wherein said initial angular velocity is a predetermined velocity, and said determining step comprises measuring the time it takes for said shaft to decelerate from said initial velocity to said measuring velocity after said shaft is decoupled from said drive unit.

17. A wheel balancing machine which comprises a chassis, a rotatable shaft, means on one end of said shaft for removably mounting the wheel to be balanced, carrier means for supporting said shaft on said chassis, driving means for rotating said shaft to a predetermined measuring velocity, means for measuring the angular velocity of the rotating shaft, and unbalance measuring means including two piezoelectric cells for sensing unbalance, said cells being mounted in fixed relationship to one another but movable in concert in a direction perpendicular to the plane of said wheel, said measuring means being adapted to measure unbalance during one full revolution of said shaft after said shaft reaches said measuring velocity, and means for displaying the value of unbalance so measured.

18. The wheel balancing machine of claim 17 wherein said cells are movable so as to place one cell within the inner wheel rim balance plane.

19. The wheel balancing machine of claim 18 wherein the placement of said cell within the inner wheel rim balance plane is confirmed by a projected beam of light.

20. The process for determining the unbalance of a wheel which comprises mounting said wheel on the end of a rotatable shaft, rotating said shaft to a predetermined measuring velocity, measuring the forces of unbalance of the shaft during one full revolution of the shaft after it reaches said measuring velocity by means of two piezoelectric cells that are in fixed relationship to one another and movable in concert in a direction parallel to said shaft, and displaying the values of the forces so measured.

21. The process of claim 20 wherein prior to rotating said shaft, one piezoelectric cell is positioned within the inner wheel rim balance plane.

22. The process of claim 21 wherein the position of the piezoelectric cell within the inner wheel rim balancing plane is determined by observing the reflection off the inner rim of the wheel of a light beam projected perpendicular to the shaft within the balance plane by light projection means fixably mounted in alignment with the movable piezoelectric cell.

* * * * *